United States Patent
Munevar

(10) Patent No.: US 10,180,080 B2
(45) Date of Patent: Jan. 15, 2019

(54) ELECTROMAGNETIC PROPELLER BRAKE

(71) Applicant: Rolls-Royce North American Technologies, Inc., Indianapolis, IN (US)

(72) Inventor: Erik Alexander Munevar, Indianapolis, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 15/453,382

(22) Filed: Mar. 8, 2017

(65) Prior Publication Data

US 2017/0260872 A1 Sep. 14, 2017

Related U.S. Application Data

(60) Provisional application No. 62/305,744, filed on Mar. 9, 2016.

(51) Int. Cl.
| | |
|---|---|
| *H02P 3/00* | (2006.01) |
| *F01D 21/00* | (2006.01) |
| *F02C 7/36* | (2006.01) |
| *F02C 9/56* | (2006.01) |
| *B64D 27/02* | (2006.01) |
| *H02P 3/06* | (2006.01) |
| *H02P 3/02* | (2006.01) |

(52) U.S. Cl.
CPC ........... *F01D 21/006* (2013.01); *B64D 27/02* (2013.01); *F02C 7/36* (2013.01); *F02C 9/56* (2013.01); *H02P 3/025* (2013.01); *H02P 3/06* (2013.01); *F05D 2220/76* (2013.01); *F05D 2260/903* (2013.01); *F05D 2270/052* (2013.01); *Y02T 50/671* (2013.01)

(58) Field of Classification Search
CPC .............................. H02P 21/006; B64D 27/02
USPC .......................................................... 318/373
See application file for complete search history.

(56) References Cited

U.S. PATENT DOCUMENTS

| | | | |
|---|---|---|---|
| 3,812,411 | A | 5/1974 | Johnson et al. |
| 5,282,719 | A | 2/1994 | McCarty et al. |
| 5,451,141 | A | 9/1995 | Carvalho et al. |
| 7,621,117 | B2 | 11/2009 | Dooley et al. |
| 8,464,511 | B1 | 6/2013 | Ribarov et al. |
| 8,857,191 | B2 | 10/2014 | Hyde et al. |
| 9,764,848 | B1 * | 9/2017 | Vondrell ............. B64D 27/18 |
| 2006/0254255 | A1 * | 11/2006 | Okai .................... B64D 27/24 60/226.1 |
| 2014/0010652 | A1 | 1/2014 | Suntharalingam et al. |
| 2014/0377079 | A1 | 12/2014 | Gieras et al. |
| 2015/0001306 | A1 | 1/2015 | Ottobon et al. |
| 2016/0214601 | A1 * | 7/2016 | Ito ........................ B60K 6/48 |

* cited by examiner

*Primary Examiner* — Erick Glass
(74) *Attorney, Agent, or Firm* — Shumaker & Sieffert, P.A.

(57) ABSTRACT

Techniques are described for using an electrical motor to slow down or stop a propulsor during an operation mode where the engine is to be otherwise running but the speed of the propulsor should be low or the propulsor should be stopped.

18 Claims, 6 Drawing Sheets

ELECTROMAGNETIC PROPELLER BRAKE

This application claims the benefit of U.S. Provisional Application No. 62/305,744, filed Mar. 9, 2016, which is incorporated herein by reference in its entirety.

TECHNICAL FIELD

The present disclosure relates to braking systems, and more particularly, to propeller braking systems.

BACKGROUND

For safety, a turbine engine limits the thrust generated by a propeller, rotor, or fan in certain modes such as when the aircraft that includes the gas turbine engine is on the ground. One or more electrical generators coupled to one or more shafts of the gas turbine engine, and rotation of the shafts provides the mechanical power for the one or more electrical generators to generate electrical power.

SUMMARY

In some examples, the disclosure describes a turbine engine comprising a shaft, a propulsor configured to rotate in response to the shaft rotating, and an electrical motor configured to generate electrical power in response to the rotation of the propulsor in a first operation mode, and slow or stop the rotation of the propulsor in a second operation mode.

In some examples, the disclosure describes a method of electronic braking in a turbine engine system, the method comprising generating, with an electrical motor in a first operation mode, electrical power in response to rotation of a propulsor caused by rotation of a shaft, and slowing or stopping, with the same electrical motor in a second operation mode, the propulsor.

In some examples, the disclosure describes a turbine engine system comprising a shaft, a propulsor configured to rotate in response to the shaft rotating, and an electrical motor comprising means for generating electrical power in response to rotation of a propulsor caused by rotation of a shaft in a first operation mode, and means for slowing or stopping the propulsor in a second operation mode.

The details of one or more examples of this disclosure are set forth in the accompanying drawings and the description below. Other features, objects, and advantages of this disclosure will be apparent from the description and drawings, and from the claims.

DETAILED DESCRIPTION

Figure 1:
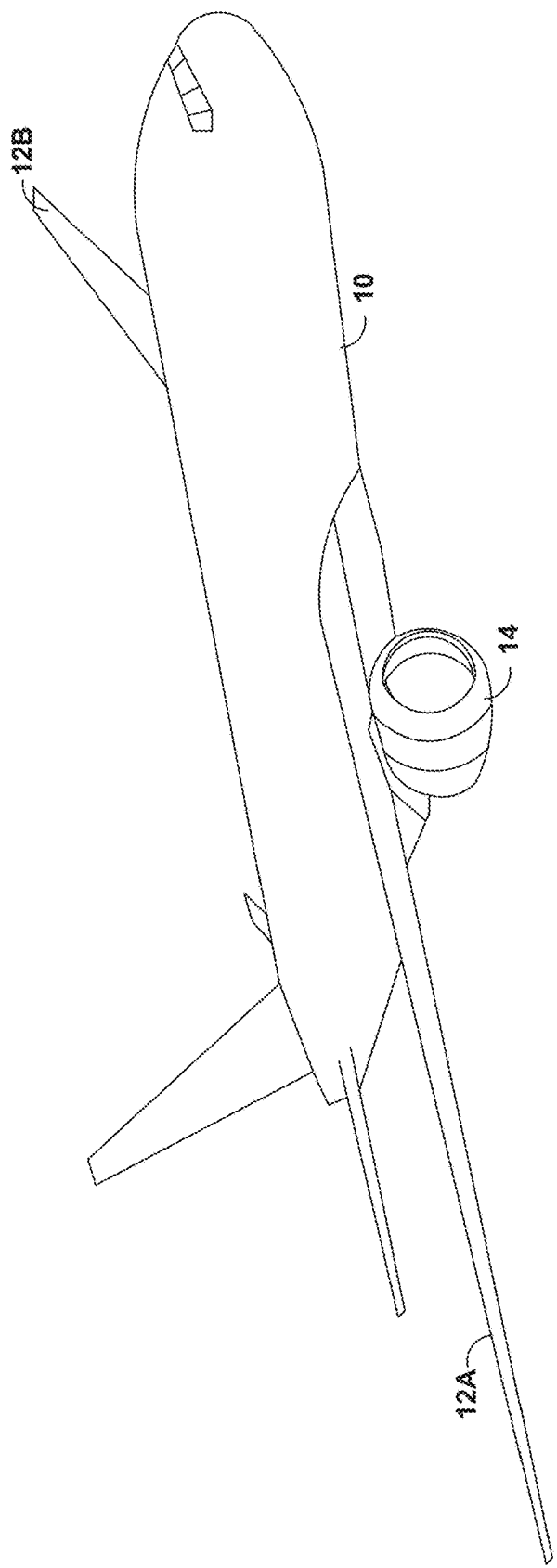
FIG. 1 is a block diagram illustrating an example vehicle configured to perform one or more example techniques described in this disclosure.

The disclosure describes example techniques to leverage an electrical generator of a gas turbine engine as an electronic brake to reduce the rotation speed of a propeller, rotor, or fan of the engine. During a first mode of operation, such as normal operation where the engine is causing a device to move, the rotation of the propeller, rotor, or fan provides the electrical generator with the mechanical power to generate electrical power. During a second mode of operation, such as hoteling mode where reduced thrust is desired, the electrical generator may function as an electrical motor and apply a torque in opposite direction of rotation of the propeller, rotor, or fan, which reduces the rotation speed or stops the propeller, rotor, or fan. In some examples, a controller may increase the resistance on the output of the electrical generator, which increases the torque needed to rotate a motor rotor of the electrical motor, which in turn reduces the speed or stops the propeller, rotor, or fan. In this way, by leveraging an already existing component of the engine to provide electronic braking capabilities, the example techniques described in this disclosure may selectively reduce thrust generated by the propeller, rotor, or fan with minimal to no increase in size or weight and without additional hardware that may increase chances of component or interfacing system failures.

Vehicles such as aircraft have different modes of operation. In a first mode (also called normal mode), a propulsor (e.g., a propeller, rotor, or fan) of a gas turbine engine rotates and provides the necessary thrust to move the vehicle. In a second mode (also called hoteling mode), such as when the vehicle is idling, it may be beneficial to keep the engine running so that there is power to environmental comfort systems or critical components, but for safety purposes the rotation of the propulsor may be slowed or stopped to limit the thrust.

In hoteling mode, the aircraft is on the ground with engines at idle; however, for the safety of the ground personnel, to prevent damaging facilities on the ground, or to prevent damaging any cargo or any unanchored material that could transition through the path of thrust generated by the engine, it is desired to reduce or stop engine thrust. Still, for these modes, operators may also require the gas turbine engines to be running to enable quick turnaround times or to provide power to other platform accessories driven by the engine core (e.g., critical components like display panel and other controllers).

One way to slow or stop the rotation of the propulsor is to use a mechanical brake to stop the propulsor from rotating. However, use of a mechanical brake increases installation size and weight, which also increases platform integration complexity and opportunities for component or interfacing system failures.

Rather than relying on mechanical braking to stop or slow down the rotation of a propulsor, this disclosure describes example ways to use electromotive force to stop or slow down the rotation of the propulsor. For instance, this disclosure describes example ways to leverage an already present electrical generator in the engine system to provide this electromotive force to stop or slow down the rotation of the propulsor in the hoteling mode. As described in more detail herein, this disclosure describes ways to, in the hoteling mode, increase an amount of torque required to rotate a motor rotor of the electrical motor that is coupled to the propulsor to cause the propulsor to slow down or stop. For instance, motor may apply a torque to the motor rotor that counters the rotation of the motor rotor, which slows down or stops the motor rotor. Since the motor rotor is coupled to the propulsor, the slowing or stopping of the motor rotor results in the stopping or slowing of the propulsor. As another example, in hoteling mode, an increased electrical braking load may be coupled to the output of the electrical motor, which may increase the amount of torque needed to rotate the motor rotor. This increases the amount of torque needed to rotate the propulsor.

In a gas turbine engine, the propulsor is coupled to a shaft (e.g., a low pressure shaft, as described below) such that the rotation of the shaft causes the propulsor to rotate. In this disclosure, the example techniques may stop or slow down the rotation of the shaft, and the shaft is coupled to propulsor meaning that stopping or slowing down the shaft stops or slows down the rotation of the propulsor. In some cases, the example techniques may more directly stop or slow down the rotation of the propulsor. Accordingly, in this disclosure, description of slowing down or stopping the rotation of the shaft leads to the slowing or stopping of the propulsor.

Once the propulsor is stopped, a controller can apply power to the electrical motor causing the motor rotor to hold position by applying torque as needed. For instance, in normal operation, the propulsor may rotate in one direction, and a torque may be needed to counter the direction in which the propulsor is rotating. However, a gust of wind or some other source may cause the propulsor to rotate in a direction opposite to the direction during normal operation. It may be desirable to ensure that such other sources do not cause the propulsor to rotate for safety reasons. Therefore, having a controller that applies power to hold the position of the propulsor by applying torque in either direction may be beneficial. In this way, the controller may slow down the rotation of the propulsor, stop the rotation of the propulsor, or hold the position of the propulsor.

The disclosure describes examples of using an electronic brake that is implemented with a generator (e.g., electrical motor) and drive and generator control system (e.g., unit that controls the power electronics) to provide electromotive forces needed for the generator to slow down or stop the rotation of the propulsor. Because the motor rotor of the electrical motor is stopped or slowed down, the electrical motor may not generate any additional power. Therefore, the power electronics receive power from some other power source (referred to as platform power).

To stop or slow down the rotation of the propulsor, this disclosure describes an electrical motor that is configured to generate electrical power in response to rotation of the propulsor in a first operational mode (e.g., normal mode) and slow or stop the rotation of the propulsor in a second operational mode (e.g., hoteling mode). In this way, the example techniques may minimize the additional hardware required to implement a braking function on the engine spool shaft that drives a propeller, rotor, or fan (e.g., propulsor). The techniques using existing generators and gearbox configurations may eliminate redesign of gearbox(es) and interfacing engine systems that would be required for mechanical brake systems. Furthermore, the braking function implemented with electrical machines and electronics tend to be more reliable than typical mechanical systems.

As described above, the power electronics may receive power from other power sources allowing the techniques described herein to take advantage or existing airframe electrical architectures utilizing available electrical power on the platforms for stopping or slowing down the rotation of the propulsor. Platform electrical power may be sourced from other generators coupled to other shafts of the same engine, generators on other engines, generators on auxiliary power units, or electrical energy storage devices.

FIG. 1 is a block diagram illustrating an example vehicle configured to perform one or more example techniques described in this disclosure. For instance, FIG. 1 illustrates a top view of vehicle 10, which in the example of FIG. 1 is an airplane. Vehicle 10 includes wings 12A and 12B, and in the illustrated example, respective engines 14 (only one of which is illustrated in FIG. 1) is coupled to a respective set of wings 12A and 12B. In other examples, there may be only one engine, and the engine may be coupled to a backend of vehicle 10. Other configurations and locations of engines 14 are possible, including examples where vehicle 10 includes one or more engines 14, and the examples should not be considered limited to the example illustrated in FIG. 1.

Also, although vehicle 10 is illustrated as an airplane, the example techniques are not limited to vehicle 10 being an airplane. The example techniques may be applicable to helicopters, unmanned space vehicles, fixed wing vehicles, variable wing vehicles, rotary wing vehicles, hover crafts, and other airborne vehicles. In some cases, vehicle 10 need not necessarily be an airborne vehicle, and may be any vehicle that is propelled by a propulsor.

Engines 14 are configured to provide a motive force to vehicle 10 and may be an internal combustion engine such as a gas turbine engine. Examples of engines 14 include a turboprop engine, a turbofan engine, or the like. For instance, engines 14 are coupled to or include respective propulsors, and rotation of the propulsors causes thrust, which in turn causes vehicle 10 to move.

In a first mode of operation (e.g., normal operation), engines 14 cause respective propulsors to rotate to provide the thrust. However, there may be some operational modes where engines 14 are to remain operational, but any or all of the propulsors should be stopped or slowed down.

One way to stop the propulsors would be to turn off engines 14. However, in addition to rotating the propulsors, engines 14 provide one or more electrical generators the mechanical force to generate electrical power. For example, one electrical generator may be coupled to respective high pressure shafts of engines 14, and the rotation of the high pressure shafts, when engines 14 are operational, allows the electrical generators to generate electrical power. In some cases, the electrical power generated by such electrical generators may be used to power environmental comfort systems or critical components such as cockpit displays, emergency lighting, and the like.

Accordingly, in a second mode of operation, referred to as hoteling mode, engines 14 may remain operational to provide power to environmental comfort systems or critical components, but the propulsors may be stopped or slowed down to reduce or eliminate thrust provided by engines 14. For example, while vehicle 10 is on the ground, for safety of the ground personnel, cargo, unanchored material, the propulsors may not provide thrust, but engines 14 should be operational to enable quick turnaround times and to provide power to other accessories. When in the hoteling mode, the propulsors can be turned off with mechanical braking. However, components needed for mechanical braking increase cost and size and can be prone to damage and malfunction.

This disclosure describes example ways of using electromotive force to stop or slow down the rotation of the propulsors. As described above, one electrical generator generates electrical power in response to rotation of a high pressure shaft of respective engines 14. In some cases, another electrical generator generates electrical power in response to rotation of the propulsor, where the propulsor rotates in response to rotation of a low pressure shaft of respective engines 14.

For example, the electrical generator includes a motor rotor, where the motor rotor includes a shaft. The motor rotor may be mechanically coupled to gear trains, for example through splined shafts, or may be electromechanically coupled to the drive shaft (e.g., low pressure shaft) of respective engines 14. In some examples, the engine drive shafts, such as a low pressure shaft or a high pressure shaft, may include integrated electrical generators (e.g., in which the rotor of the electrical generator is integrated in the low pressure shaft or high pressure shaft).

Because the motor rotor of the electrical generator is coupled to the propulsor of respective engines 14, by causing the motor rotor to increase a torque required to the rotate the propulsor, the electrical generator may stop or slow down the rotation of the propulsor. For example, rather than the electrical generator turning mechanical energy into electrical energy, the electrical generator may convert electrical energy applied to it into mechanical or electromagnetic energy to apply a torque opposite the rotational direction or the propulsor, or an increased electrical braking load may be applied to the electrical generator, which increases the torque required to the rotate the propulsor.

The electrical motor, which is an example of the electrical generator, may generate a torque (e.g., via a magnetic field) opposite to the rotation of the motor rotor, which results in a torque opposite to the rotational direction of the propulsor. For example, during normal operation where the electrical motor is generating electrical power, the motor rotor rotates in a first direction along with the propulsor; however, during hoteling mode, the electrical motor applies torque in a second, opposite direction to the rotational direction of propulsor to cause rotation of the propulsor to slow. If the counter-torque is equal to the force from the propulsor, the propulsor stops moving.

There are other ways to slow or stop the rotation of the propulsor using the electrical motor (e.g., implement electromagnetic braking). For example, a drive and generator control system may increase the electrical braking load or resistance applied to the electrical motor. The increase in resistance will increase the torque necessary to rotate the motor rotor of the electrical motor which effectively slows down the propulsor, and may stop rotation of the propulsor if the electrical braking load is great enough. When stopped, the drive and generator control system may hold the position of the motor rotor to prevent propulsor rotation.

For example, the turbine engine system described in this disclosure may include one or more electrical braking loads (e.g., resistors) that are selectively coupled to an output of the electrical motor in the second operation mode and, when coupled, increase a resistance driven by the electrical motor from a first resistance level in the normal operation mode to a second resistance level in the hoteling operation mode. Increasing the resistance to the second resistance level increases torque needed to rotate the motor rotor of the electrical motor, and an increase in torque needed to rotate the motor rotor of the electrical motor causes the propulsor to slow or stop rotation.

As described, gas turbine applications such as those that include engines 14 include propulsion shaft gearboxes for customer accessories. A generator can be an added accessory or an existing customer generator can be used to provide braking or stopping force on the propulsion shaft (e.g., the low pressure shaft that couples to the propulsor). An electric motor drive and brake controller can be added to work with an existing generator control unit or the existing generator control unit can be swapped with a combined motor drive and generator control unit. The generator motor drive and braking capability can be used to slow down or prevent the propeller, shaft, or fan (e.g., propulsor) from rotating during various modes when the engine is running. Existing accessory generators can exceed the power required to slow down or stop a free turbine propulsion shaft of an engine at idle.

Figure 2:
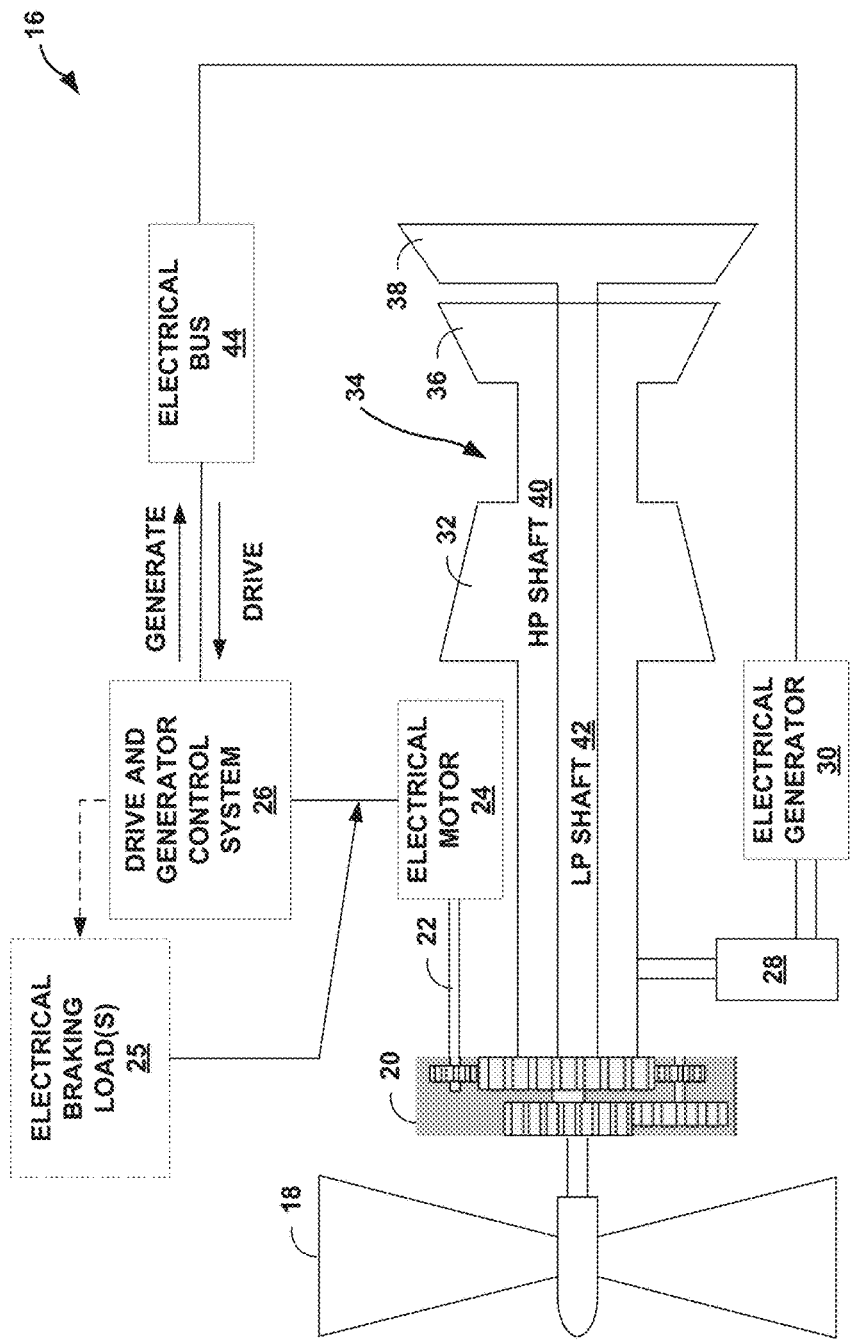
FIG. 2 is a block diagram illustrating an example gas turbine engine of the vehicle of FIG. 1, where an electronic generator is used to also provide electronic braking capabilities.

FIG. 2 is a block diagram illustrating an example gas turbine engine system in which an electrical generator is used to also provide electronic braking capabilities. FIG. 2 illustrates gas turbine engine system 16, which is one example of engines 14. As illustrated, gas turbine engine system 16 includes propulsor 18 (e.g., a propeller, rotor, or fan) coupled to gearbox 20. Gearbox 20 is coupled to low pressure (LP) shaft 42. Gearbox 20 may be a mechanical gearbox or an electromagnetic gearbox. For ease of description, in many of the examples described in this disclosure, gearbox 20 is described as a mechanical gearbox. However, the techniques are equally applicable to examples where gearbox 20 is an electromagnetic gearbox.

As described below, LP shaft 42 rotates causing propulsor 18 to rotate to provide thrust. For example, compressor 32 receives and compresses a working fluid, such as air, prior to the working fluid being mixed with fuel in combustor 34. Combustor 34 mixes the working fluid with fuel and combusts the mixture. The products of the combustion are expanded in turbine 36 and also expanded in turbine 38. Through compressor 32, combustor 34, and turbine 36, the working fluid is in high pressure. Compressor 32 and turbine 36 are coupled to high pressure (HP) shaft 40 and collectively form a HP spool. The expansion of the working fluid in turbine 36 drives compressor 32.

The expansion in turbine 38 is at a lower pressure. Turbine 38 is coupled to LP shaft 42, along with propulsor 18 (via gearbox 20). Together, propulsor 18 and turbine 38 form a LP spool. The expansion of the working fluid in turbine 38 also causes turbine 38 to drive propulsor 18 via LP shaft 42.

In a first mode of operation (e.g., normal operation where LP shaft 42 causes propulsor 18 to rotate), the rotation of propulsor 18 causes one or more gears in gearbox 20 to rotate, and the rotation of the one or more gears in gearbox 20 causes the gear at the end of motor rotor shaft 22 to rotate, which causes motor rotor shaft 22 to rotate. Motor rotor shaft 22 is the shaft of the motor rotor internal to electrical motor 24. The rotation of motor rotor shaft 22 causes electrical motor 24 to generate electrical power (e.g., voltage and current). In the illustrated example, the electrical power generated by electrical motor 24 flows through drive and generator control system 26 to electrical bus 44. In some examples, the electrical power generated by electrical motor 24 may be directed by the drive and generator control system 26 to bypass any power electronics and directly feed electrical bus 44. Examples of electrical motor 24 include permanent magnet machines or wound field machines.

In the example illustrated in FIG. 2, motor rotor shaft 22 is a separate, independent unit of the motor rotor of electrical motor 24. However, this need not always be the case. In some examples, electrical motor 24 may be embedded onto LP shaft 42. LP shaft 42 itself may function as a motor rotor. For example, the rotor permanent magnets or windings of electrical motor 24 may be housed around or integrated in LP shaft 42. The windings or permanent magnets of the motor stator of electrical motor 24 may substantially surround a portion of the circumference of LP shaft 42. During normal operation, the rotation of LP shaft 42 causes the electrical motor to output electrical power. In this example, the electrical motor around LP shaft 42 increases a torque required to rotate LP shaft 42 to counter the rotation of LP shaft 42 (e.g., by applying a counter-torque to LP shaft 42 or increasing an electrical braking load applied to electrical motor 24), and therefore slows or stops the rotation of LP shaft 42. As propulsor 18 is coupled to LP shaft 42, the slowing or stopping of the rotation of LP shaft 42, slows or stops the rotation of propulsor 18.

In another example not illustrated in FIG. 2, electrical motor 24 may be embedded into gearbox 20, which may be a mechanical gearbox as illustrated, but alternatively may be an electromagnetic gearbox. In examples in which electrical motor 24 is embedded into a mechanical gearbox 20, the stator permanent magnet or windings of electrical motor 24 may be in a housing around one of the gears in gearbox 20, and the rotor permanent magnet or windings of electrical motor 24 may be integrated in the gear or a shaft coupled to the gear. In some such examples, the gear or gear shaft around which electrical motor 24 is formed functions similar to a motor rotor. During normal operation, the rotation of the gear shaft causes the electrical motor to output electrical power. In such examples, the electrical motor 24 may increase a torque required to rotate the gear shaft that functions like motor rotor shaft 22 (e.g., by applying a counter-torque to LP shaft 42 or increasing an electrical braking load applied to electrical motor 24). The slowing or stopping of the gear shaft, causes the gear coupled to LP shaft 42 to slow down or stop, which in turn causes propulsor 18 to slow down or stop.

In examples in which gearbox 20 is an electromagnetic gearbox, the example techniques described with respect to the example where gearbox 20 is a mechanical gearbox may similarly apply. For example, in an electromagnetic gearbox, the coupling between shafts is from magnetic coupling and not mechanical coupling like in a mechanical gearbox. However, the operation of a gear shaft functioning as motor rotor shaft 22 is the same.

Accordingly, although the examples are described with respect to motor rotor shaft 22, the techniques described in this disclosure should not be considered limited to the example in FIG. 2. In examples where electrical motor 24 is formed around LP shaft 42, LP shaft 42 is an example of a motor rotor or motor rotor shaft. In examples where electrical motor 24 is embedded in gearbox 20, a gear shaft is an example of a motor rotor or motor rotor shaft.

As described in more detail below, power electronics of drive and generator control system 26 may output a current to flow through electrical motor 24 (e.g., coils of electrical motor 24) to cause electrical motor 24 to generate the counter-torque that stops or slows down propulsor 18. The power electronics may similarly output the current in examples in which electrical motor 24 is formed around LP shaft 42 or embedded within gearbox 20.

Also, as described in more detail below, drive and generator control system 26 may increase the resistance driven by electrical motor 24 that causes an increase in torque needed to rotate the motor rotor, which in turn increase torque needed to rotate moto rotor shaft 22, which causes propulsor 18 to slow down or stop. Drive and generator control system 26 may similarly increase the resistance driven by electrical motor 24 in examples where electrical motor 24 is formed around LP shaft 42 or embedded in gearbox 20.

Electrical bus 44 is the electrical interconnect through which various accessories (e.g., components that need electrical power) receive power. As illustrated, in addition to electrical motor 24 providing power to electrical bus 44, electrical bus 44 receives power from electrical generator 30. For instance, one or more gears within gearbox 28 rotate due to HP shaft 40, which causes a motor rotor of electrical generator 30 to rotate and cause electrical generator 30 to generate electrical power. In some examples, electrical bus 44 may receive power from any other platform source such as from electrical energy storage device, one or more generators on other engines, or auxiliary power unit (APU).

Although possible, not all accessories need to necessarily receive power from both electrical motor 24 and electrical generator 30. For instance, some critical accessories may receive power from electrical generator 30, whereas some less critical accessories may receive power from electrical motor 24. Also, although electrical motor 24 and electrical generator 30 are illustrated in FIG. 2, gas turbine engine system 16 may include more or fewer electrical motors or generators. For example, although LP shaft 42 and HP shaft 40 are illustrated in FIG. 2, gas turbine engine system 16 may include more shafts, and these additional electrical motors or generators may be coupled to LP shaft 42, HP shaft 40, or to one of these additional shafts.

In FIG. 2, electrical motor 24 is described as a "motor" and electrical generator 30 is described as a "generator" because in some cases, rather than generating electrical power, electrical motor 24 may influence the rotation of motor rotor shaft 22 to provide a counter-force to the rotation of propulsor 18. For instance, in normal mode, motor rotor shaft 22 is driven by the rotation of propulsor 18, but in some other modes, such as hoteling mode, motor rotor shaft 22 is driven by electrical motor 24.

It should be understood that although electrical generator 30 is illustrated as generating electrical power from HP shaft 40, in some examples, an electrical motor similar to electrical motor 24 may generate electrical power in response to rotation of HP shaft 40 or provide torque to HP shaft 40. For instance, rather than having electrical generator 30, an HP motor generator may be generate power in response to rotation of HP shaft 40 and function like electrical generator 30, as described above. In addition, the HP motor generator, in another mode of operation, may provide torque to HP shaft 40. For consistency, electrical motor 24 may be referred to as an LP motor generator to help distinguish the two generators. HP motor generator may be a starter that provides torque to rotate HP shaft 40 to start the engine, and is sometimes referred to as an Electric Starter Generator (ESG). For ease, the disclosure describes examples with respect to electrical generator 30, but the HP motor generator may perform these functions as well.

As described above, in some cases, gas turbine engine system 16 may function in hoteling mode. In the hoteling mode, compressor 32, combustor 34, and turbine 36 should keep functioning so that electrical generator 30 can provide electrical power (e.g., so that HP shaft 40 is rotating in both normal mode and hoteling mode). However, propulsor 18 should not rotate or the rotation speed should be slowed down.

Drive and generator control system 26 may be configured to deliver electrical power to electrical motor 24 to cause electrical motor 24 to torque the motor rotor in the direction opposite to the direction in which the motor rotor rotates during normal mode, which in turn causes motor rotor shaft 22 to rotate in the opposite direction as well. This may slow or stop rotation of propulsor 18. Because propulsor 18 is stopped or slowed down, electrical motor 24 generates little to no electrical power. Accordingly, during the hoteling mode, drive and generator control system 26 may receive electrical power to control electrical motor 24 from electrical generator 30 via electrical bus 44. Electrical generator 30 is one example of delivery power to drive and generator control system 26. In some examples, drive and generator control system 26 may receive power from any other platform source such as from electrical energy storage device, one or more generators on other engines, or auxiliary power unit (APU).

In some examples, turbine engine system 16 includes one or more electrical braking loads 25 coupled to the output of electrical motor 24. In FIG. 2, electrical braking loads 25 are illustrated as being in series between electrical motor 24 and drive and generator control system 26. However, there may be other locations where electrical braking loads 25 are connected within turbine engine system 16 such as electrical bus 44. Electrical braking loads 25 are not necessary in every example.

Electrical braking loads 25 may provide another example way to apply electromagnetic braking to propulsor 18. As one example, electrical braking loads 25 may include a plurality of resistors or other resistive loads that can be selectively coupled together to set the resistance that electrical motor 24 drives. Other examples of electrical braking loads 25 are possible such as existing electrical loads not normally in use such as electrical anti-ice systems.

In the normal mode, drive and generator control system 26 may bypass electrical braking loads 25 or possibly set the resistance of electrical braking loads 25 to be low, and in some examples, approximately zero ohms. In the hoteling mode, drive and generator control system 26 may selectively couple one or more electrical braking loads to the output of electrical motor 24 such that there is an increase in resistance driven by electrical motor 24 from the first resistance level in the normal mode to a second resistance level in the hoteling mode. For example, electrical motor 24 can be considered as driving a certain amount of load at a first resistance level in the normal mode. In the hoteling mode, drive and generator control system 26 adds resistance via electrical braking loads 25 so that there is an increase in resistance driven by electrical motor 24 from the first resistance level to a second resistance level.

The increase in resistance increases torque needed to rotate the motor rotor, and an increase in torque needed to rotate the motor rotor causes propulsor 18 to slow or stop rotation (e.g., via motor rotor shaft 22, as one example, although also applicable to examples where electrical motor 24 is formed around LP shaft 42 or embedded within gearbox 20). In this way, electrical motor 24 may be configured to slow or stop the rotation of propulsor 18.

Drive and generator control system 26 may be configured to determine an amount of resistance needed to increase torque required to rotate the motor rotor and slow down or stop propulsor 18, and couple one or more of electrical braking loads 25 (e.g., set the resistance of electrical braking loads 25) based on the determined amount of resistance. The increase in torque needed to rotate the motor rotor may cause the motor rotor, and hence, motor rotor shaft 22, to eventually stop, which causes propulsor 18 to stop.

In some examples, after stopping (e.g., via increase in torque required to rotate propulsor 18 or due to counter-torque applied to the motor rotor), drive and generator control system 26 may apply power to electrical motor 24 to cause the motor rotor to keep propulsor 18 from rotating in either direction. For instance, if propulsor 18 is rotating in one direction, and drive and generator control system 26 causes propulsor 18 to stop moving in that direction, it is possible without control that a gust of wind or some other perturbation source (e.g., coupling form HP shaft 40) causes propulsor 18 to rotate. Drive and generator control system 26 may be configured to detect such movement in propulsor 18 (e.g., via LP shaft 42, as one possibility), and apply the appropriate counter-torque needed to keep propulsor 18 held in position.

In this way, in one example, drive and generator control system 26 may slow down propulsor 18 by using controls of power electronics to provide current into electrical motor 24 and create an electromotive torque opposite to the current rotation of motor rotor shaft 22. In one example, drive and generator control system 26 may hold propulsor 18 using the same controls to direct current into electrical motor 24 to create an electromotive torque in either direction to counter any coupling from HP shaft 40 or perturbations from external environment such as wind gust. In one example, drive and generator control system 26 may increase the electrical resistive load to electrical motor 24 to increase the torque necessary to rotate motor rotor shaft 22 to slow down or hold the position of propulsor 18. To increase resistance, components like electrical braking loads 25 may be used, as well as possibly needing cooling interfaces to avoid system 16 from overheating.

Accordingly, in the example techniques described in this disclosure, turbine engine system 16 includes a shaft (e.g., LP shaft 42) and propulsor 18 configured to rotate in response to LP shaft 42 rotating. Turbine engine system 16 also includes electrical motor 24 configured to generate electrical power in response to the rotation of propulsor 18 in a first operation mode (e.g., normal mode) and slow or stop the rotation of propulsor 18 in a second operation mode (e.g., hoteling mode).

Turbine engine system 16 includes gearbox 20, and electrical motor 24 includes a motor rotor having motor rotor shaft 22 coupled to propulsor 18 via gearbox 20 (e.g., mechanically coupled via one or more gears within gearbox 20 or an electromagnetic gearbox). In the first operation mode, the rotation of propulsor 18 causes motor rotor shaft 22 to rotate in a first direction, and rotation of motor rotor shaft 22 causes the electrical motor to generate electrical power. In the second operation mode, in some examples, electrical motor 24 produces a counter torque on motor rotor shaft 22, which effectively torques propulsor 18 in a second direction opposite to the first direction to slow or stop the rotation of propulsor 18. As another example, in the second operation mode, an amount of torque needed to rotate motor rotor shaft 22 increases causing the rotation of propulsor 18 to slow or stop. Again, in some examples, LP shaft 42 or a gear shaft within gearbox 20 may function as a motor rotor or motor rotor shaft such as where electrical motor 24 is formed on LP shaft 42 or embedded within gearbox 20.

Although not illustrated, additional accessories such as fuel pumps and the like may be coupled to HP shaft 40 or LP shaft 42 via additional gearboxes or through gearbox 20 or 28. Moreover, there may be additional electrical generators or other types of power sources such as batteries that provide power to drive and generator control system 26 during the hoteling mode. In some examples, two or more power sources together provide power to drive and generator control system 26 during the hoteling mode.

Figure 3:
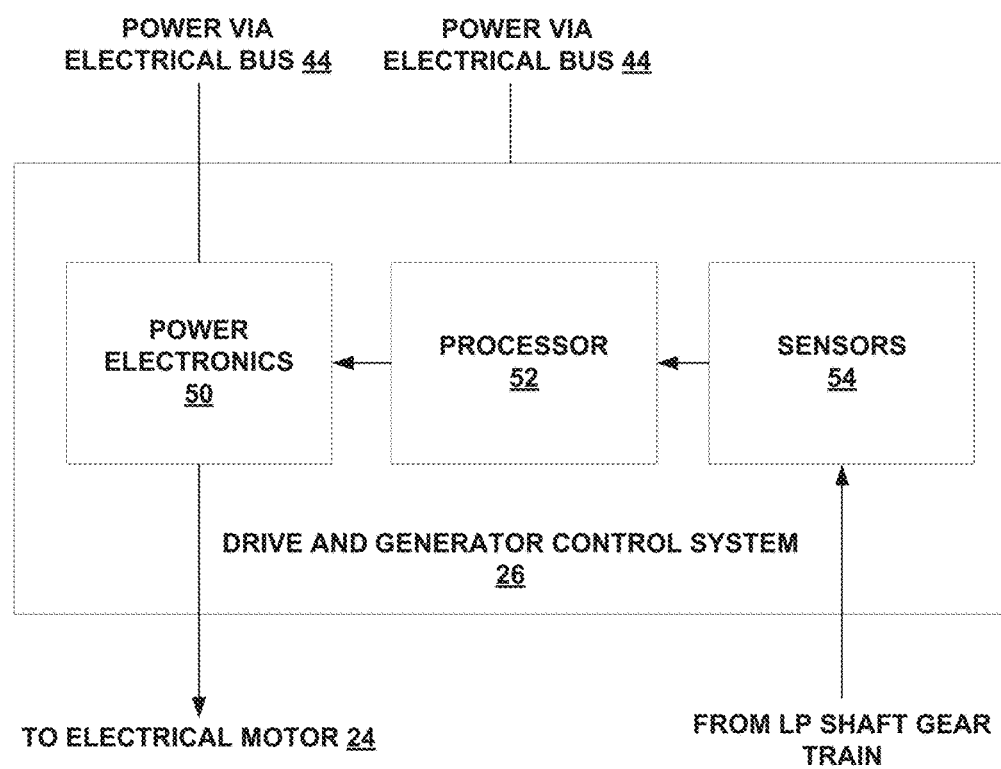
FIG. 3 is a block diagram illustrating an example of a drive and generator control system of FIG. 2 in greater detail.

FIG. 3 is a block diagram illustrating an example of a drive and generator control system of FIG. 2 in greater detail. As illustrated, drive and generator control system 26 includes power electronics 50 and processor 52. Sensor 54 is an optional unit, but is illustrated as being part of drive and generator control system 26 in this example. Although these components are illustrated as being proximate to one another, these components need not necessarily be proximate to one another on vehicle 10.

Drive and generator control system 26 and power electronics 50 receive power via electrical bus 44. However, drive and generator control system 26 and power electronics 50 need not necessarily receive power from the same power source. For example, electrical generator 30 may provide power to power electronics 50 and some other power source may power drive and generator control system 26, or electrical generator 30 provides power to both power electronics 50 and drive and generator control system 26.

The output of power electronics 50 is a voltage or current to electrical motor 24 that causes electrical motor 24 to generate the counter-torque on motor rotor shaft 22 to stop or slow down the rotation of propulsor 18. Processor 52 determines the voltage or current level of the voltage or current that power electronics 50 is to provide electrical motor 24. Examples of processor 52 include one or more microprocessors, application specific integrated circuits (ASICs), field programmable gate arrays (FPGAs), digital signal processors (DSPs), or other equivalent integrated or discrete logic circuitry.

In some examples, processor 52 executes an algorithm to determine the voltage or current that power electronics 50 is to provide electrical motor 24. For instance, the algorithm may be based on a set of "position control laws" that define how much voltage or current power electronics 50 is to output based on a position of LP shaft 42 (which again rotates with propulsor 18). Processor 52 may be embedded with the position control laws, and the position control laws may be specifically selected for the particular turbine engine system 16 (e.g., based on the type of LP shaft 42, HP shaft 40, and gearbox 20, as a few non-limiting examples).

Processor 52 may utilize the position of LP shaft 42 (or possibly the position of LP shaft 42 at different times) as an input into the position control laws algorithm and determine the current or voltage that power electronics 50 is to apply. For instance, if LP shaft 42 is rotating faster than the desired setpoint, processor 52 may determine that there should be an increase in the current or voltage that power electronics 50 outputs to increase the electromotive force that electrical motor 24 applies via motor rotor shaft 22.

There are various ways in which processor 52 may determine the position of LP shaft 42. As one example, sensor 54 may sense the position of LP shaft 42 and output information indicative of the position to processor 52. Sensor 54 may already be a part of turbine engine system 16 or may be added. For example, sensor 54 may be any speed or position sensor on the gear train of LP shaft 42 that can be used to derive speed and position of the coupled motor rotor of electrical motor 24.

Figure 4:
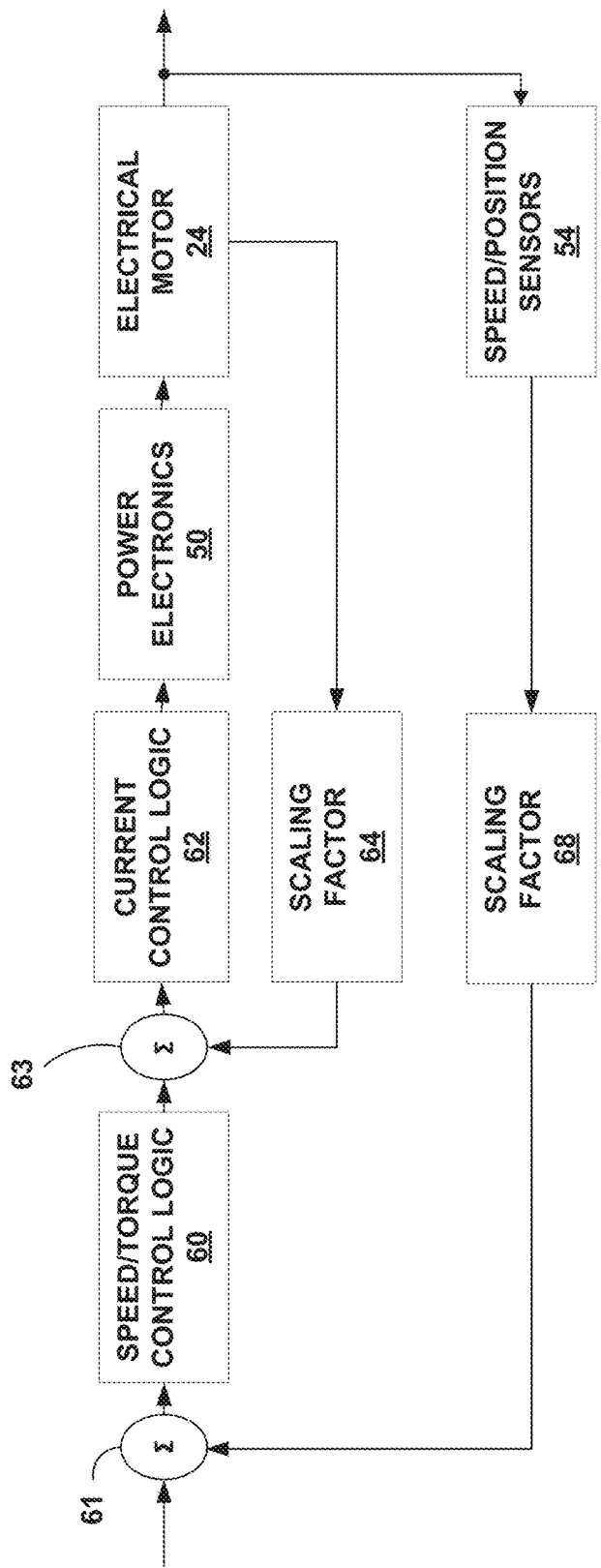
FIG. 4 is a block diagram illustrating sensor control to determine shaft speed and position.
Figure 5:
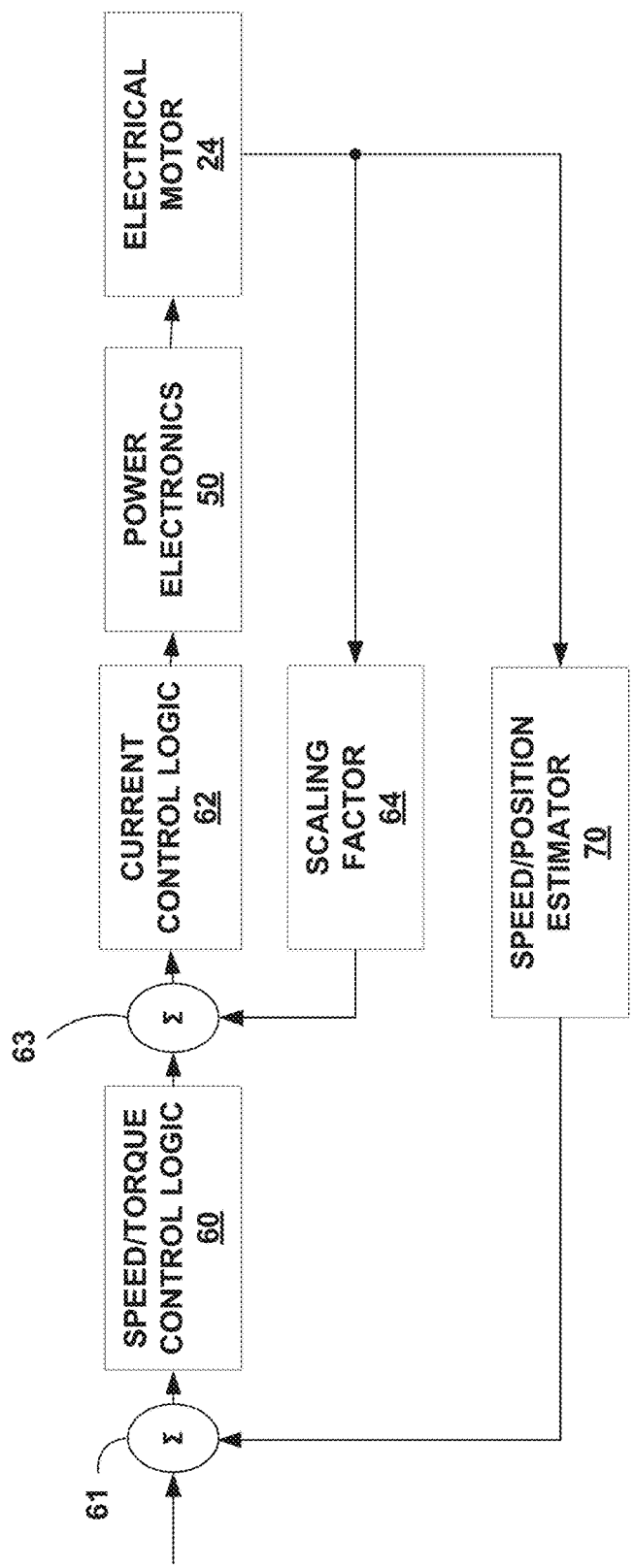
FIG. 5 is a block diagram illustrating sensorless control to determine shaft speed and position.

Alternatively, processor 52 may implement a sensorless technique to determine the position of LP shaft 42. "Sensorless" is used to mean without senor that senses mechanical position. During hotel mode operation, processor 52 may determine the amount of braking power that electrical motor 24 is delivering as power electronics 50 is attempting to stop propulsor 18. From the amplitude and phase of the back EMF (electro-motive-force), processor 52 may determine the position of LP shaft 42. Processor 52 may determine the voltage or current that power electronics 50 is to provide based on sensor 54, in a sensorless way, or a combination using both sensor 54 and sensorless techniques to more accurately determine the position of LP shaft 42 from which processor 52 determines the voltage or current that power electronics 50 provides. FIGS. 4 and 5 describe examples of the algorithms used to determine the voltage or current power electronics 50 is to output.

In this way, drive and generator control system 26 may utilize existing sensors or have additional sensors to provide position feedback to drive and generator control system 26 for precise control of the position of LP shaft 42 (e.g., to precisely determine that LP shaft 42 is not moving). Alternatively or additionally, drive and generator control system 26 may utilize sensorless control feedback to control the position of LP shaft 42. In some examples, drive and generator control system 26 may be separated from a generator control unit (not shown) that controls electrical motor 24 during normal operation. In some other examples, drive and generator control system 26 may be part of the generator control unit to provide the functionality of both a drive and generator control system to stop or slow down propulsor 18 during hoteling mode and a generator control unit to control the voltage and current generated by electrical motor 24 during normal operation.

FIG. 4 is a block diagram illustrating sensor control to determine shaft speed and position. The algorithm illustrated in FIG. 4 may be performed by processor 52, and the illustrated blocks may be hardware circuitry, software blocks executed on hardware circuitry, or some combination thereof. For example, summer 61, speed/torque control logic 60, summer 63, current control logic 62, scaling factor 64, and scaling factor 68 may be hardware circuitry of processor 52, software blocks executing on hardware circuitry of processor 52, or a combination thereof. Speed/position sensors 54 may be hardware sensors that sense the speed and position of LP shaft 42, as one example. The scaling that scaling factor 64 and/or scaling factor 68 provide may be known from proportional relationships of electrical motor 24.

In the example of FIG. 4, drive controls (e.g., drive and generator control system 26) can utilize speed and position sensors 54 to determine rotor speed and position (e.g., speed and position of motor rotor shaft 22). Many aerospace applications utilize redundant sensors to determine shaft speeds. However, adding additional sensors add cost, increase complexity (due to the additional wiring), and can reduce reliability (senor connectors can be prone to contamination from dirt and humidity).

In the example of FIG. 4, the input into summer 61 is the desired speed, represented by co, and the desired position of LP shaft 42, represented by θ, and a scaled sensed speed and position of LP shaft 42. For example, speed/position sensors 54 sense the speed ($\omega_m$) and position ($\theta_m$) of LP shaft 42, and scaling factor 68 scales the sensed speed and position. Summer 61 may sum the two input values and generate error signals between the referenced and sensed or estimated signals. In some examples, scaling factor 68 may be a negative number, meaning that summer 61 subtracts the sensed speed and position from the desired speed and position.

Speed/torque control logic 60 receives the output from summer 61 and determines the current needed to apply to electric motor 24 and outputs the value to summer 63. Summer 63 also receives a scaled value of the actual current with which power electronics 50 is driving electrical motor 24. For example, scaling factor 64 may scale the current, represented by $i_m$, and output the value to summer 63. Summer 63 may sum the two values, and similar to above, if scaling factor 64 is a negative number, summer 63 essentially subtracts the actual current from the determined current. Also, like above, summer 63 generates error signals between the referenced and sensed or estimated signals.

The output of summer 63 may be a current value represented by $i_e$ that current control logic 62 receives. Current control logic 62 may then determine whether to increase the amount of current flowing through electrical motor 24 or decrease the amount of current flowing through electrical motor 24. Current control logic 62 may then cause power electronics 50 to increase or decrease the current flowing through electrical motor 24. In this way, based on the sense speed and position, processor 52 may control the speed and position of LP shaft 42 to stop or slow down propulsor 18, and keep it in a stopped position.

FIG. 5 is a block diagram illustrating sensorless control to determine shaft speed and position. FIG. 5 is similar to FIG. 4, blocks having the same reference number in FIG. 5 function substantially similar to block having the same reference number in FIG. 4. These blocks are not described further with respect to FIG. 5.

As illustrated, FIG. 5 includes speed/position estimator 70, rather than sensors, since FIG. 5 illustrates sensorless control. In the example of FIG. 5, rather than the scaled, sensed position and speed as being inputs to summer 61, speed/position estimator 70 may estimate the speed and position of LP shaft 42 and output the speed and position to summer 61.

One example way in which speed/position estimator 70 may estimate the speed and position is through back electromotive-force (EMF). In back EMF, as the outer field coils of the motor stator of electrical motor 24 are energized in a sequence, the magnetic fields of the coils create the magnetic force that rotates motor rotor shaft 22. As motor rotor shaft 22 rotates relative to the magnetic field, stator coil voltage in orthogonal direction of current flow results and is proportional to the speed of motor rotor shaft 22. This opposing voltage is referred to as EMF. As coils are energized in sequence the voltage also drops on the de-energized coils. The voltage or currents on the coils can be measured to derive the position and speed of motor rotor shaft 22 with processor 52 being configured with information of the proportional relationships.

Figure 6:
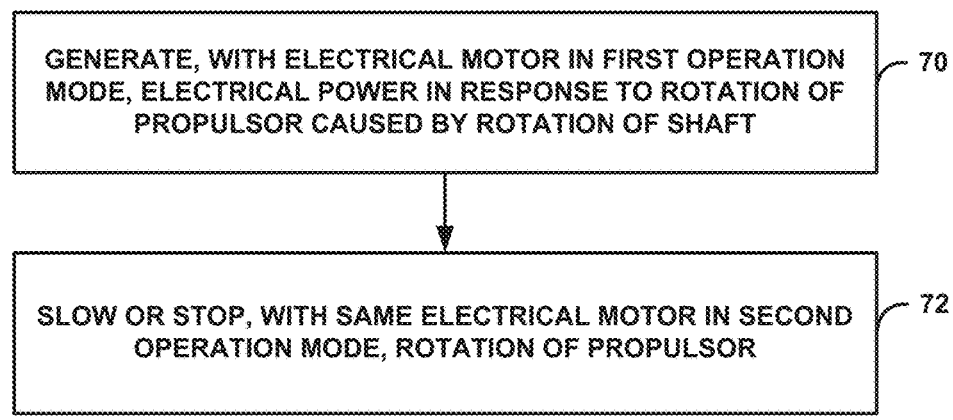
FIG. 6 is a flow diagram illustrating example method of braking in a turbine engine system, in accordance with techniques described in this disclosure.

FIG. 6 is a flow diagram illustrating example method of braking in a turbine engine system, in accordance with techniques described in this disclosure. As illustrated, electrical motor 24, in a first operation mode, generates electrical power in response to rotation of propulsor 18 caused by rotation of LP shaft 42 (70). The same electrical motor 24, in a second operation mode, slows or stops the rotation of propulsor 18 (72).

For example, generating the electrical power includes rotating motor rotor shaft 22 of electrical motor 24 due to rotation of propulsor 18 in a first direction to cause electrical motor 24 to generate the electrical power. Slowing or stopping propulsor 18 includes producing via motor rotor shaft 22 a torque in a second direction opposite to the first direction or increasing an amount of torque needed to rotate motor rotor shaft 22 which causes the rotation of propulsor 18 to slow or stop.

As described above, power electronics 50 may output a voltage or current that causes electrical motor 24 to generate the torque to stop or slow rotation of motor rotor shaft 22, which results in slowing or stopping the rotation of propulsor 18 in the second operation mode. As another example, processor 52 may selectively couple one or more electrical braking loads 25 to increase the resistance driven by electrical motor 24, which in turn causes motor rotor shaft 22 to slow down or stop, which in turn causes propulsor 18 to slow down or stop.

Processor 52 may determine how much current or voltage power electronics 50 is to deliver to electrical motor 24 to control an amount of counter-force generated by electrical motor 24. Processor 52 may similarly determine an amount of resistance needed to increase torque required to rotate motor rotor shaft 22 and slow down or stop propulsor 18.

In some examples, processor 52 may determine a rotation position of at least one LP shaft 42 or propulsor 18 (e.g., via sensor 54 or sensorless techniques, or both with sensor 54 and sensorless techniques), and drive and generator control system 26 may control an amount of counter-torque generated by electronic motor 24 based on the determined rotational position of at least one of LP shaft 42 or propulsor 18.

Various examples of this disclosure have been described. These and other examples are within the scope of the following claims.

What is claimed is:

1. A turbine engine system comprising:
   a low-pressure shaft;
   a propulsor configured to rotate in response to the low-pressure shaft rotating;
   a high-pressure shaft;
   a compressor configured to receive air and compress the air;
   a combustor configured to mix the compressed air and fuel and combust the mixture;
   a turbine configured to expand the combusted mixture to rotate the high-pressure shaft; and
   an electrical motor configured to:
     generate electrical power in response to the rotation of the propulsor in a first operation mode; and
     slow or stop the rotation of the propulsor in a second operation mode, wherein the high-pressure shaft rotates during the first operation mode and the second operation mode.

2. The turbine engine system of claim 1, further comprising:
   one or more electrical braking loads that are selectively coupled to an output of the electrical motor in the second operation mode and, when coupled, increase a resistance driven by the electrical motor from a first resistance level in the first operation mode to a second resistance level in the second operation mode,
   wherein increasing the resistance to the second resistance level increases torque needed to rotate a motor rotor of the electrical motor, and
   wherein an increase in torque needed to rotate the motor rotor of the electrical motor causes the propulsor to slow or stop rotation.

3. The turbine engine system of claim 2, further comprising:
   a processor configured to determine an amount of resistance needed for the second resistance level to increase torque required to rotate the motor rotor and slow down or stop the propulsor, and couple one or more of the one or more electrical braking loads to the output of the electrical motor based on the determined amount of resistance to increase the resistance to the second resistance level.

4. The turbine engine system of claim 1, further comprising:
   power electronics,
   wherein to slow or stop the rotation, the power electronics are configured to supply electrical power to the electrical motor to torque a motor rotor of the electrical motor in an opposite direction of the rotation causing the propulsor to slow down or stop.

5. The turbine engine system of claim 4, further comprising:
an electrical generator, different than the electrical motor, configured to deliver electrical power to the power electronics.

6. The turbine engine system of claim 5, wherein rotation of the high-pressure shaft causes the electrical generator to deliver the electrical power to the power electronics.

7. The turbine engine system of claim 4, further comprising:
a processor configured to determine how much current or voltage the power electronics is to deliver to the electrical motor to control the torque produced by the motor rotor.

8. The turbine engine system of claim 1, further comprising:
one or more sensors configured to determine a rotational position of at least one of the low-pressure shaft or the propulsor; and
a drive and generator control system configured to control an amount of torque a motor rotor of the electrical motor produces in a direction opposite to a direction of rotation of the propulsor to slow or stop the rotation of the propulsor or to increase an amount of torque needed to rotate the motor rotor to cause the rotation of the propulsor to slow or stop based on the rotational positional.

9. The turbine engine system of claim 1, wherein a motor rotor of the electrical motor is formed around or integrated into the low-pressure shaft, and wherein the electrical motor applies a torque to the low-pressure shaft to slow or stop the rotation of the propulsor.

10. The turbine engine system of claim 1, further comprising a gearbox, wherein a motor rotor of the electrical motor is embedded on a gear shaft within the gearbox, and wherein the electrical motor applies a torque to the gear shaft to slow or stop the rotation of the propulsor.

11. A method of electronic braking in a turbine engine system, the method comprising:
receiving air and compressing the air;
mixing the compressed air and fuel and combusting the mixture; and
rotating a high-pressure shaft based on expansion of the combusted mixture,
generating, with an electrical motor in a first operation mode, electrical power in response to rotation of a propulsor caused by rotation of a low-pressure shaft; and
slowing or stopping, with the same electrical motor in a second operation mode, the propulsor, wherein the high-pressure shaft rotates during the first operation mode and the second operation mode.

12. The method of claim 11, further comprising
selectively coupling one or more electrical braking loads to an output of the electrical motor in the second operation mode to increase a resistance driven by the electrical motor from a first resistance level in the first operation mode to a second resistance level in the second operation mode,
wherein increasing the resistance to the second resistance level increases torque needed to rotate a motor rotor of the electrical motor, and
wherein an increase in torque needed to rotate the motor rotor of the electrical motor causes the propulsor to slow or stop rotation.

13. The method of claim 12, further comprising:
determining an amount of resistance needed for the second resistance level to increase torque required to rotate the motor rotor and slow down or stop the propulsor; and
coupling one or more of the one or more electrical braking loads to the output of the electrical motor based on the determined amount of resistance to increase the resistance to the second resistance level.

14. The method of claim 11, further comprising:
supplying, with power electronics, electrical power to the electrical motor to drive a motor rotor of the electrical motor to produce torque in opposite direction of the rotation of the propulsor.

15. The method of claim 14, further comprising:
delivering electrical power to the power electronics with an electrical generator that is different than the electrical motor.

16. The method of claim 15, wherein rotation of the high-pressure shaft causes the electrical generator to deliver the electrical power to the power electronics.

17. The method of claim 11, further comprising:
determining a rotational position of at least one of the low-pressure shaft or the propulsor; and
controlling, with a drive and generator control system, an amount of torque a motor rotor of the electrical motor produces in a direction opposite to direction of rotation of the propulsor to slow or stop the rotation of the propulsor or to increase an amount of torque needed to rotate the motor rotor to cause the rotation of the propulsor to slow or stop based on the rotational positional.

18. A turbine engine system comprising:
a shaft;
a propulsor configured to rotate in response to the shaft rotating;
an electrical motor comprising configured to:
generate electrical power in response to rotation of the propulsor in a first operation mode; and
slow or stop rotation of the propulsor in a second operation mode; and
one or more electrical braking loads that are selectively coupled to an output of the electrical motor in the second operation mode and, when coupled, increase a resistance driven by the electrical motor from a first resistance level in the first operation mode to a second resistance level in the second operation mode, wherein increasing the resistance to the second resistance level increases torque needed to rotate a motor rotor of the electrical motor, and wherein an increase in torque needed to rotate the motor rotor of the electrical motor causes the propulsor to slow or stop rotation.

* * * * *